Oct. 14, 1930.                 D. G. STEELY                 1,778,537
                       CANDY MAKING SYSTEM AND METHOD
                            Filed June 10, 1927
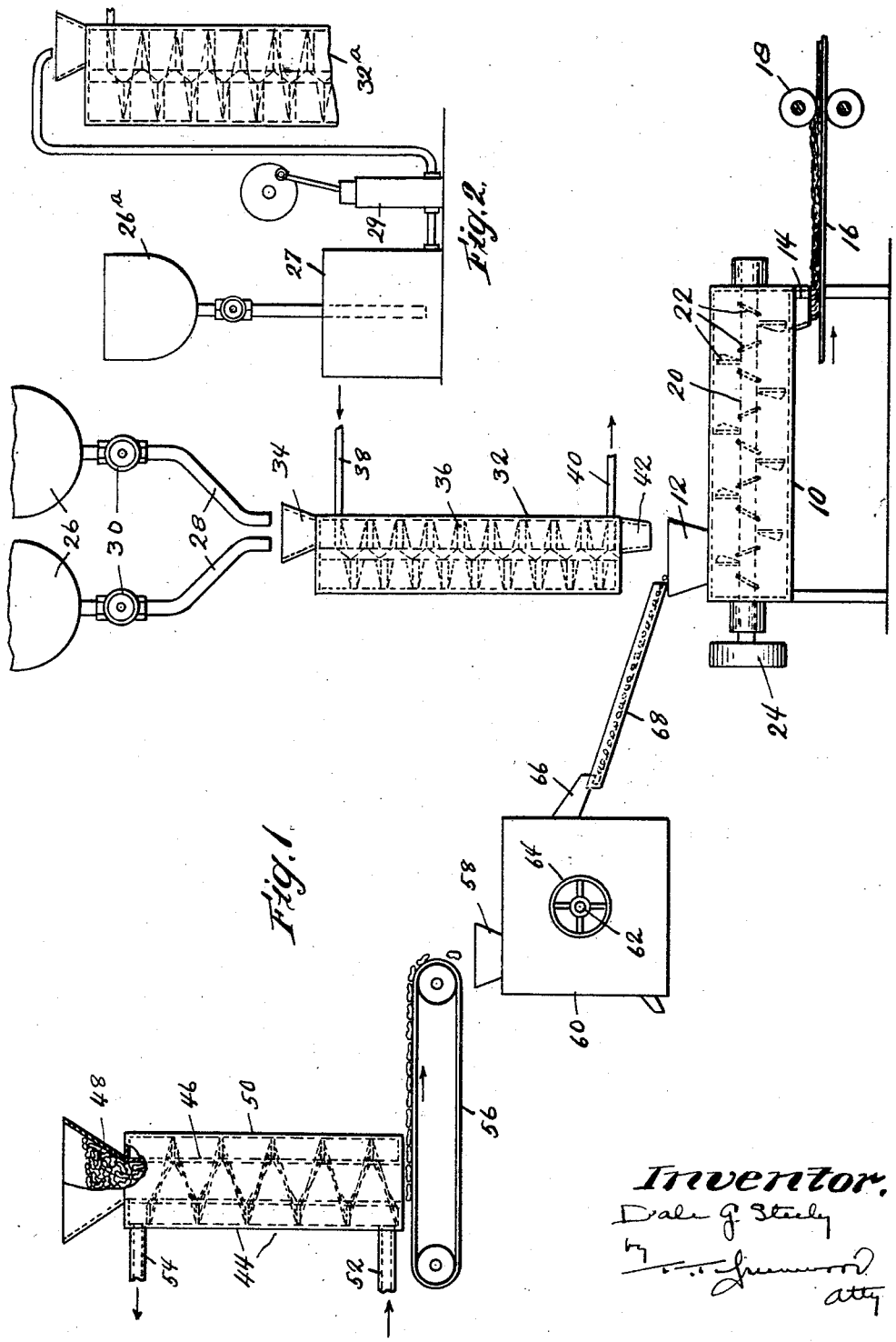
Inventor,
Dale G. Steely Patented Oct. 14, 1930

1,778,537

UNITED STATES PATENT OFFICE

DALE G. STEELY, OF BOSTON, MASSACHUSETTS, ASSIGNOR TO W. F. SCHRAFFT & SONS CORPORATION, OF BOSTON, MASSACHUSETTS, A CORPORATION OF MASSACHUSETTS

CANDY-MAKING SYSTEM AND METHOD

Application filed June 10, 1927. Serial No. 197,958.

This invention relates to the making of confections and has particular reference to the manufacture of peanut candy and the like.

Peanut candy comprises essentially roasted peanuts mixed with a syrup, and sometimes containing other ingredients, and made into many shapes. It usually is brittle although it is made plastic, like taffy.

In the commercial manufacture of peanut candy, roasted peanuts and syrup are stirred and thoroughly mixed together in a mixing kettle and the batch is then poured onto a cooling plate and rolled down to the desired degree of thickness and is cut up into small pieces. Peanut candy is also made in small batches, but not as a large-scale manufacturing process, by placing the raw or unroasted peanuts into the syrup and heating the mass until the peanuts are roasted. Candy made in this manner can be identified by the color of the candy and the presence of skins on the peanuts. This method produces the best grade of peanut candy although it can not be thick with peanuts because of stirring difficulties, and can not be carried out on a large scale.

It is desirable to have as many peanuts as possible in the candy because it is then brittle and "crunches" and is thus considered the more delectable. The introduction of a large amount of cold roasted peanuts into the syrup chills and consequently thickens the syrup and so prevents good mixing of the mass and thus limits the amount of peanuts that can be mixed properly with the syrup. Consequently, it is the practice to heat the roasted peanuts before they are mixed into the syrup. This procedure is not conducive to a high quality of peanut candy since the re-heating of the roasted peanuts greatly impairs the flavor. Furthermore, a roasted peanut is quite a good heat insulator, so that it is difficult to heat the peanuts throughout to such a high temperature that the syrup will not be chilled.

It is an object of this invention to provide an improved process that can be operated on a large scale for the manufacture of peanut candy of high quality having a materially higher percentage of peanuts than is obtainable by ordinary commercial practice.

A further object is a process of making peanut candy which consists in roasting the raw peanuts and introducing the roasted peanuts into the hot syrup while they are hot and before they have had an opportunity to become cold. By this process, there is no danger of chilling the syrup and so a large amount of peanuts can be thoroughly mixed with the syrup. The flavor of the freshly roasted peanuts is preserved since they are mixed with the syrup immediately after being roasted and do not have to be reheated with a consequent loss of flavor.

A yet further object of the invention is a continuous process, as distinguished from the heretofore usual batch process, of making peanut candy wherein a continuous stream of hot and freshly-roasted peanuts and a continuous stream of hot cooked syrup are mixed together in a mixer that is adapted to discharge a continuous stream of soft hot peanut candy onto a conveyor belt or other repository for the candy.

A yet further object is generally to improve candy making processes and systems.

Fig. 1 is a diagrammatic representation of the apparatus of the improved system arranged for the performance of the invention.

Fig. 2 is a detail illustrating a modified form of continuous melter.

As shown in Fig. 1, the apparatus of the system includes a mixer 10 for the cooked syrup and the hot and freshly roasted peanuts. Said mixer comprises a long heated horizontal shell having an entrance 12 at one end and at the top thereof for the streams of syrup and peanuts and having an outlet 14 at the bottom and at the other end thereof from which a continuous stream of the mixed and soft or plastic mass of candy flows onto a conveyor 16. Said conveyor may comprise a travelling metal belt which is adapted to cool the candy-mass and may pass between vertically-adjustable rolls 18 by which the mass is rolled down to some desired dimensions. The thin sheet subsequently may be cut into various shapes in any suitable manner not necessarily shown.

The mixer is provided with a shaft 20 extended longitudinally therethrough and provided with a series of blades 22 that are adapted to stir the mass of peanuts and syrup and thoroughly mix the thick mass. Said blades are inclined in such a manner as to impel the mass from the entrance to the discharge opening of the mixer while at the same time stirring the mass. Said shaft may be driven continuously in any suitable manner as by a belt passed over the pulley 24 fixed to said shaft. Suitable means, not shown, is provided to heat the mixer.

The syrup is or may be melted in a continuous melter comprising a pair of heated kettles 26, each of which is provided with an outlet pipe 28 at the bottom thereof and a valve 30 in said pipe. The melter is so operated that a stream of syrup is flowing out of the outlet pipe of one kettle while syrup is being made in the other kettle and syrup is adapted to be drawn from this kettle upon the emptying of the first kettle. The method of operation is such as to keep up a continuous and approximately constant flow of syrup from the melter.

In Fig. 2 a modified form of continuous melter is shown. A single melting kettle 26ª is employed which is adapted to discharge into a storage tank 27 which may be heated if desirable. The syrup in the tank is pumped by a continuously-operated pump 29 into the top of the cooker 32ª thus to maintain a uniform flow of syrup into the cooker. Syrup is delivered to the tank 27 from the kettle 26ª before the contents of the tank are exhausted so that there is always syrup in the tank.

The syrup streams from the melter are adapted to pass into a continuous syrup cooker 32 located below the melter and having an entrance 34 into which the pipes 28 are disposed to direct the syrup streams flowing therefrom. Said cooker comprises a vertical shell having a spiral ramp 36 therein over and down which the syrup is adapted to flow in a thin stream. Said ramp is of metal and is hollow and steam is adapted to flow therethrough from the steam inlet 38 to the steam outlet 40 thereby to heat the ramp and cook the syrup. The cooked syrup is adapted to flow in a a continuous stream out of the outlet 42 of the cooker into the entrance 12 of the mixer, which entrance is disposed beneath said outlet. The continuous melter and continuous cooker are well known in the art and need not be further described.

The system also includes a continuous roaster 44 for the raw peanuts. Said roaster is described and claimed in my co-pending joint application with Frederick W. Blake Serial No. 197,960, filed June 10, 1927. Said roaster, as here shown, includes a long vertical tube 46 which is open at the top and the bottom and the open top is enlarged to provide a hopper 48 in which a supply of raw peanuts is adapted to be maintained. Said tube is surrounded by a shell 50 having an inlet 52 at the bottom for heated gases and an outlet 54 at the top for the used gases. The hot gases may be provided by any suitable form of heating apparatus not necessarily shown and are adapted to circulate about the tube 46 and roast the column of peanuts therein contained. A continuously-moving conveyor belt 56 is disposed below and is spaced a small distance from the lower open end of said tube 46 and is adapted to support the column of peanuts therein. Said conveyor belt is adapted to move slowly beneath said tube and to carry off the hot roasted peanuts. The speed of movement of the belt is adapted to be such that the peanuts are caused to be thoroughly roasted when they pass onto the belt from the open discharge end of the tube 46. Raw peanuts are adapted to be deposited in the hopper 48 in such manner as to maintain a supply of peanuts in the roaster so that the roasted peanuts can be withdrawn in a continuous manner from the roaster.

The peanuts preferably are roasted in the shells as this method produces the best grade of roasted peanuts. It is necessary, therefore, to remove the shells before mixing the peanuts with the syrup. To this end, the hot roasted peanuts, with the shells thereon, are caused to be discharged in a continuous manner from the conveyor belt 56 of the roaster into the entrance 58 of a shucking machine 60 which may be disposed beneath said belt. Said shucking machine is well known in the art and comprises a casing having internally-contained power-operated mechanism driven by the shaft 62 and pulley 64 that operates on the peanuts to remove the shells and the skins thereof. The shelled peanuts are discharged in a continuous manner from the discharge opening 66 of the shucking machine before they have had an opportunity to cool to any deleterious degree. The stream of hot shelled peanuts is guided by a chute 68 into the entrance 12 of the continuous mixer, wherein they are mixed with the syrup in the manner aforesaid. Peanuts are roasted both in the shell and after they have been shelled and, in commerce more peanuts are roasted after they have been shelled, than in the shell. Since the peanuts are considered to have a better flavor when roasted in the shell, however, the process has been so described herein although the present invention is workable regardless as to how the nuts are roasted.

The system thus arranged provides for the mixing, in a continuous manner, of the hot freshly roasted peanuts with the syrup before the peanuts have cooled deleteriously and thus provides a candy which is thick with peanuts of unimpaired flavor.

While the invention has been specifically described in connection with peanut candy, it is apparent that some nut other than a peanut also could be used.

I claim:

1. That step in the process of making nut candy from roasted nuts, which consists in introducing the nuts, when they are free from shell and are still hot as a result of being roasted, into hot syrup.

2. That step in the process of making peanut candy from roasted and shell-free peanuts, which consists in mixing the shell-free peanuts, while they are still hot as a result of being roasted, with hot syrup.

3. The method of making peanut candy which consists in roasting raw peanuts with the shells on, removing the shells from the hot roasted peanuts, and mixing the shelled roasted peanuts before they have cooled deleteriously with hot syrup.

4. The method of making nut candy which consists in roasting raw nuts, shelling the hot roasted nuts, and mixing the shell-free roasted nuts with hot syrup while the roasted nuts are still hot from the roasting process.

5. The method of making nut candy in a continuous manner which consists in providing a stream of hot syrup, and a stream of hot nuts, combining the streams, stirring the materials in the combined streams, and cooling the mixture.

6. The method of making nut candy in a continuous manner which consists in providing a stream of hot syrup, and a stream of hot nuts, combining the streams, stirring and mixing the materials in the combined stream, and cooling and congealing the mixture while maintaining the flow of the combined stream.

7. The steps in the method of making peanut candy in a continuous manner which consists in providing a stream of hot syrup, and a stream of roasted peanuts which are hot as a result of their being roasted and are free from shell, combining the streams, and stirring and intermixing the peanuts and the syrup in the combined stream.

8. The method of making peanut candy which consists in roasting peanuts and removing the shells therefrom in a continuous manner, cooking syrup in a continuous manner, and continuously mixing the roasted peanuts and the cooked syrup.

9. The method of making peanut candy which consists in roasting peanuts and removing the shells therefrom in a continuous manner, cooking syrup in a continuous manner, continuously mixing the roasted peanuts and the cooked syrup and depositing the mixture in a continuous manner upon a moving conveyer.

10. A candy making system comprising a continuous syrup melter, a continuous syrup cooker fed from said melter and arranged to discharge a continuous stream of cooked syrup therefrom, a continuous nut roaster arranged to receive raw nuts and to discharge a continuous stream of hot roasted nuts, and a mixer arranged to receive the continuous stream of cooked syrup and the continuous stream of hot roasted nuts and to intermix both streams and discharge a continuous stream of the mixture.

11. A candy making system comprising a continuous syrup melter, a continuous syrup cooker fed from said melter and arranged to discharge a continuous stream of cooked syrup therefrom, a continuous nut roaster arranged to receive raw nuts and to discharge a continuous stream of hot roasted nuts, a mixer arranged to receive the continuous stream of cooked syrup and the continuous stream of hot roasted nuts and to intermix both streams and discharge a continuous stream of the mixture and means to cool the stream from the mixture.

12. A candy making system comprising a continuous syrup melter, a continuous syrup cooker fed from said melter and arranged to discharge a continuous stream of cooked syrup therefrom, a continuous nut roaster arranged to receive raw nuts and to discharge a continuous stream of hot roasted nuts, a mixer arranged to receive the continuous stream of cooked syrup and the continuous stream of hot roasted nuts and to intermix both streams and discharge a continuous stream of the mixture, and a conveyor for the stream from the mixture.

13. A candy making system comprising a continuous syrup melter, a continuous syrup cooker fed from said melter and arranged to discharge a continuous stream of cooked syrup therefrom, a continuous peanut roaster arranged to receive raw nuts in the shells and to discharge a continuous stream of hot roasted nuts, a shucking machine arranged to receive the stream of hot roasted nuts and to remove the shells thereof and to discharge a continuous stream of hot shelled roasted nuts, and a mixer arranged to receive the stream of hot shelled roasted nuts and also the stream of cooked syrup and to intermix both streams and discharge a continuous stream of the mixture.

In testimony whereof, I have signed my name to this specification.

DALE G. STEELY.